(No Model.) 6 Sheets—Sheet 2.

S. S. MORTON.
SHINGLE SAWING MACHINE.

No. 376,204. Patented Jan. 10, 1888.

Witnesses

Inventor
Samuel S. Morton,
By his Attorneys,
Soulé and Co.

(No Model.) 6 Sheets—Sheet 3.
S. S. MORTON.
SHINGLE SAWING MACHINE.
No. 376,204. Patented Jan. 10, 1888.
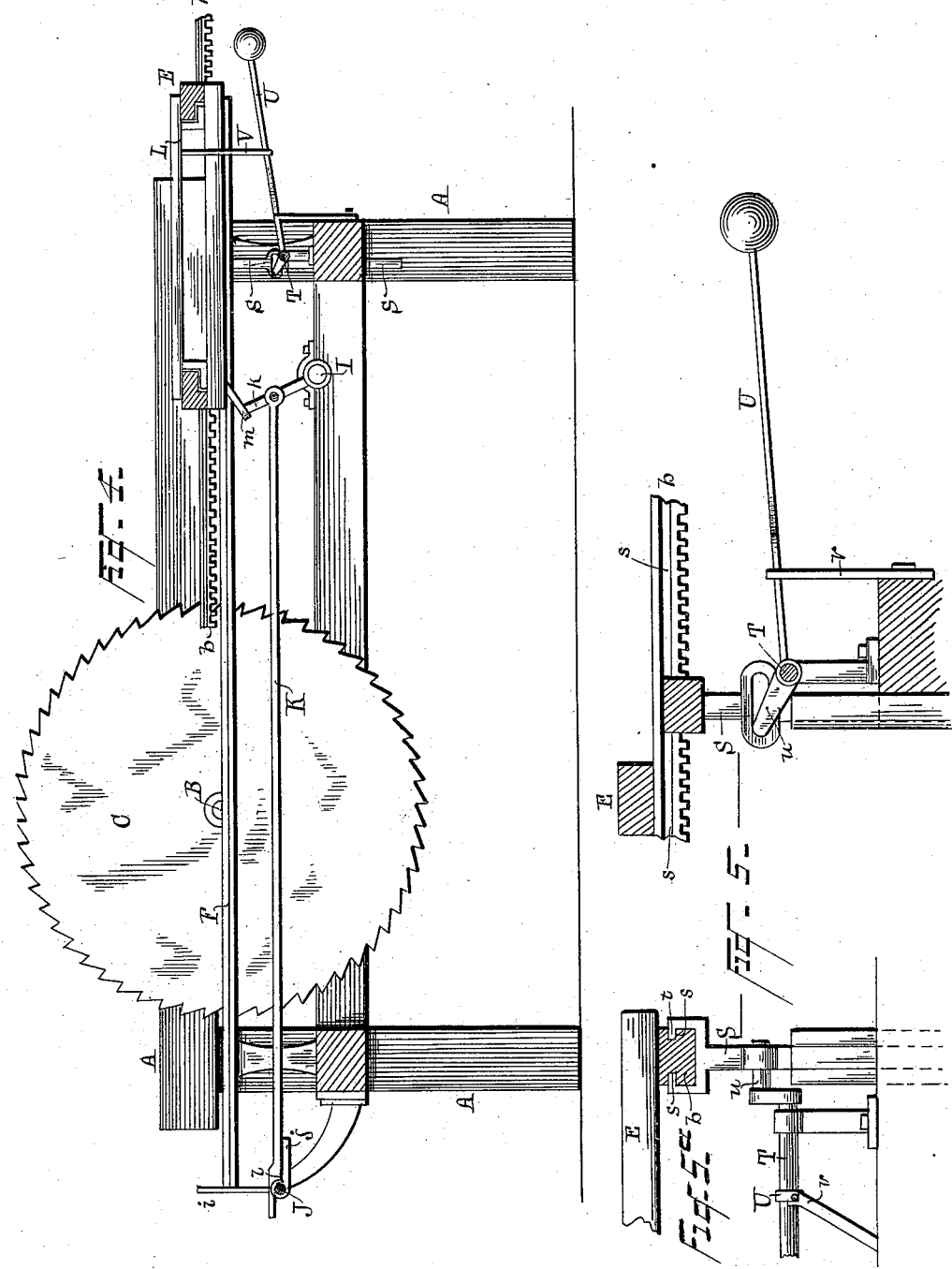

(No Model.)  6 Sheets—Sheet 4.
S. S. MORTON.
SHINGLE SAWING MACHINE.
No. 376,204.  Patented Jan. 10, 1888.
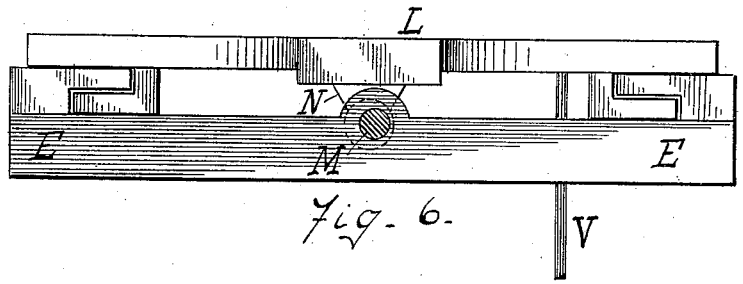
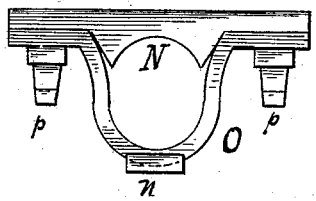
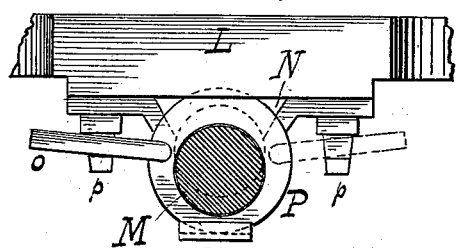
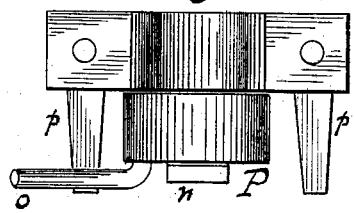
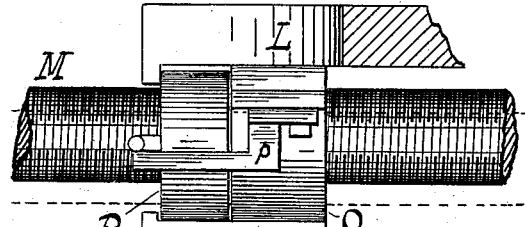
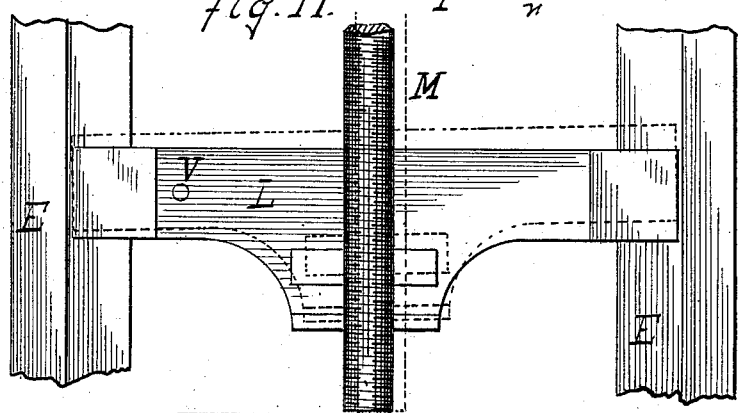
Witnesses
Inventor
Samuel S. Morton
By his Attorneys,
Soule and Co.

(No Model.) 6 Sheets—Sheet 5.

S. S. MORTON.
SHINGLE SAWING MACHINE.

No. 376,204. Patented Jan. 10, 1888.

Witnesses
Inventor
Samuel S. Morton,
By his Attorneys, (No Model.) 6 Sheets—Sheet 6.
S. S. MORTON.
SHINGLE SAWING MACHINE.
No. 376,204. Patented Jan. 10, 1888.
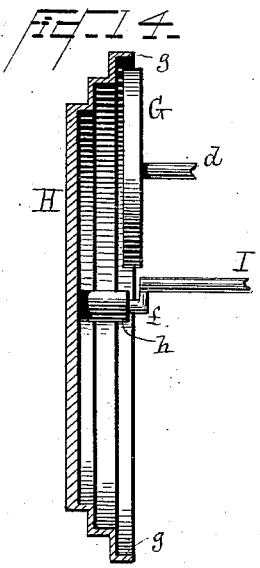
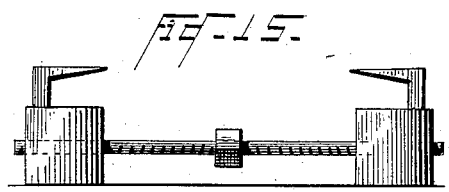
WITNESSES
Norris A. Clark
A. L. Browne
INVENTOR
Samuel S. Morton,
by Soulé and Co.
Attorneys.

UNITED STATES PATENT OFFICE.

SAMUEL S. MORTON, OF LOWER CHANCEFORD, ASSIGNOR OF ONE-HALF TO HUGH W. McCALL, OF YORK, PENNSYLVANIA.

SHINGLE-SAWING MACHINE.

SPECIFICATION forming part of Letters Patent No. 376,204, dated January 10, 1888.

Application filed December 11, 1886. Serial No. 221,306. (No model.)

*To all whom it may concern:*

Be it known that I, SAMUEL S. MORTON, a citizen of the United States, residing at Lower Chanceford, in the county of York and State of Pennsylvania, have invented certain new and useful Improvements in Shingle-Sawing Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to shingle-sawing machines, wherein the movement of the carriage in opposite directions is automatically changed, the head-block is automatically advanced toward the saw, its angle is varied to give the required taper to the shingle, and the movement of the carriage is stopped when the material needs replenishing; and the invention consists in the improved mechanism whereby these objects are accomplished. It is illustrated in the accompanying drawings, in which—

Figure 1:
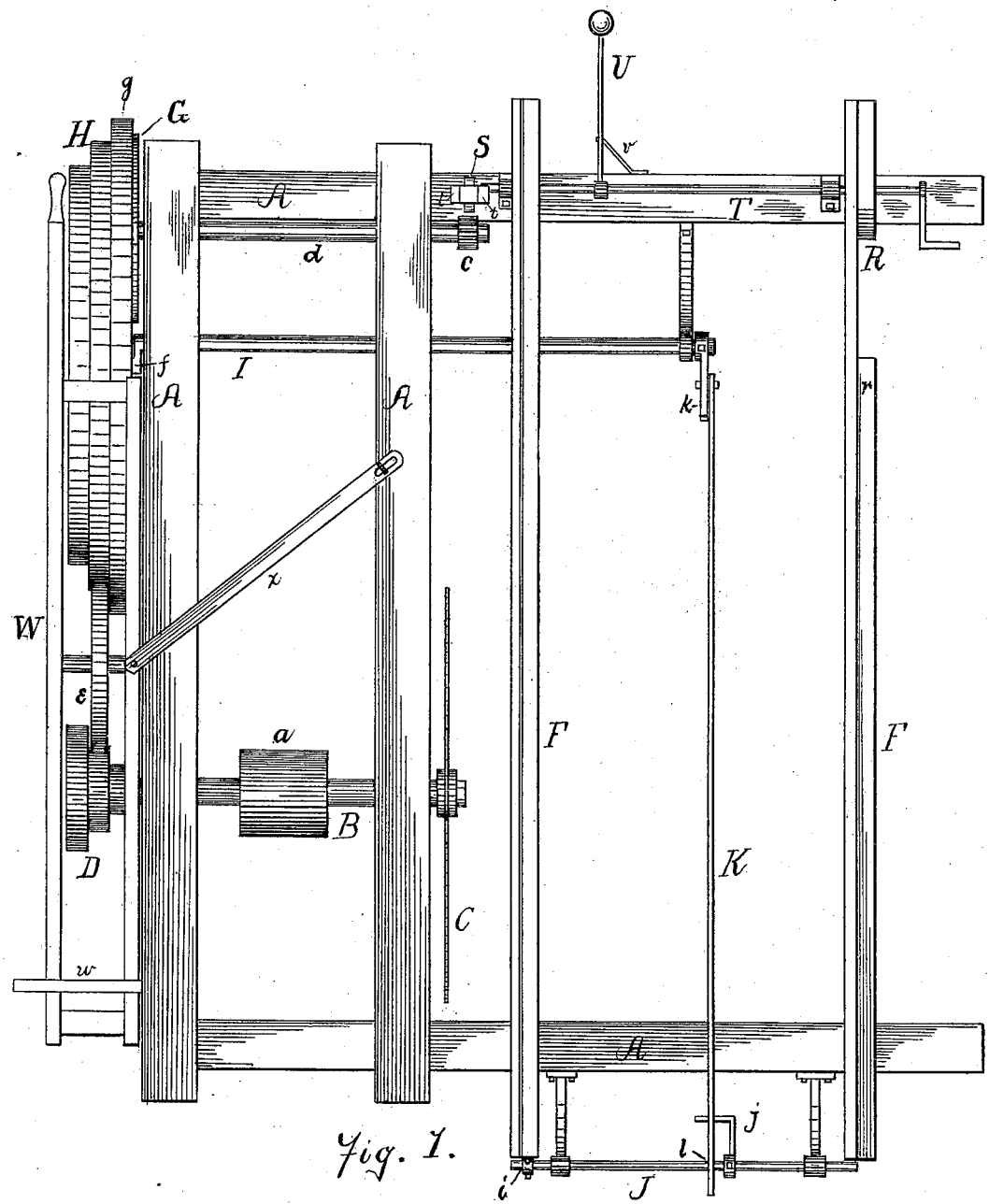
Figure 2:
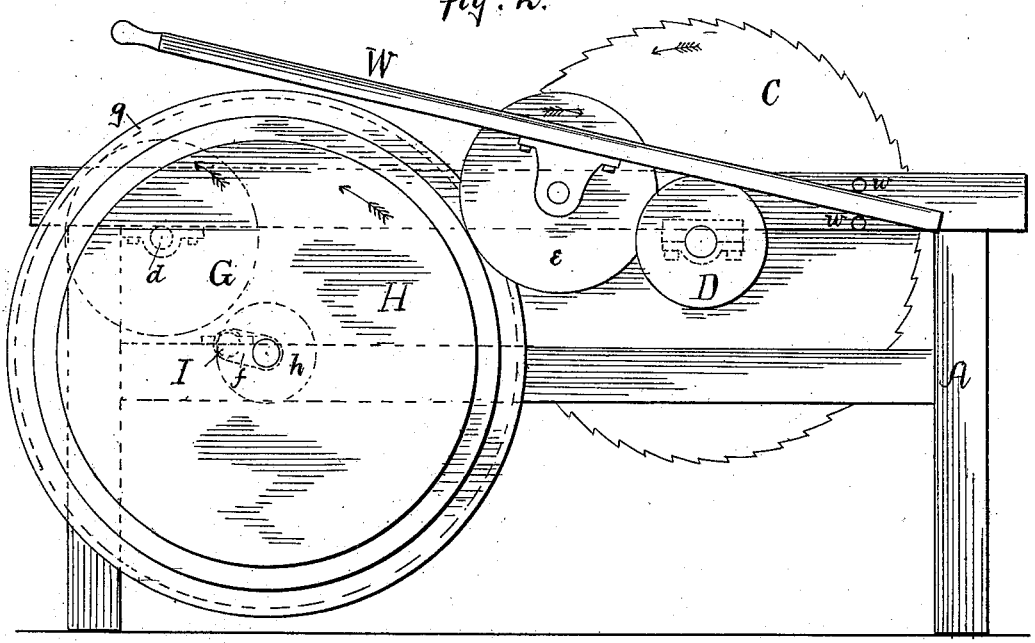
Figure 3:
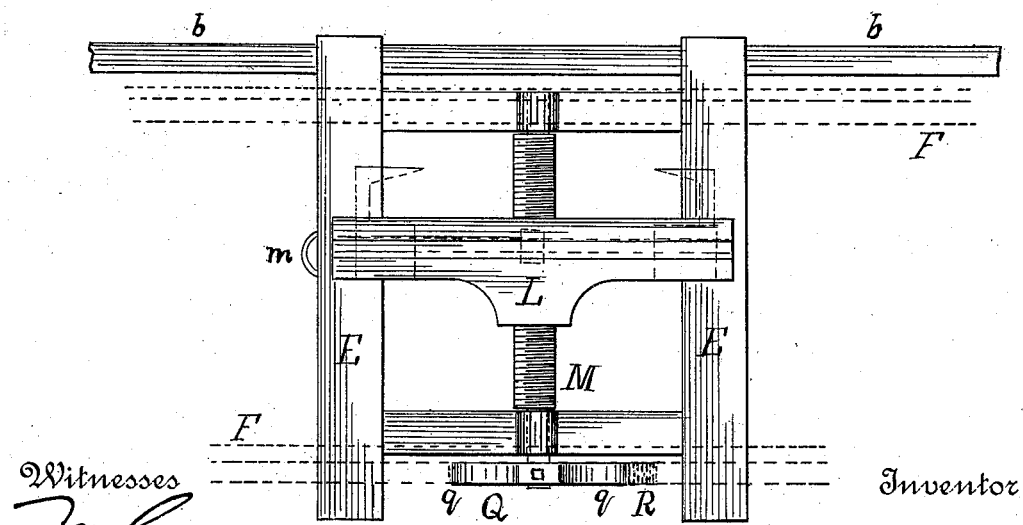
Figure 12:
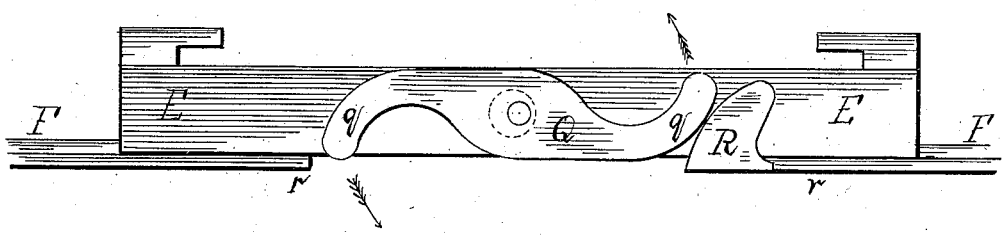
Figure 13:
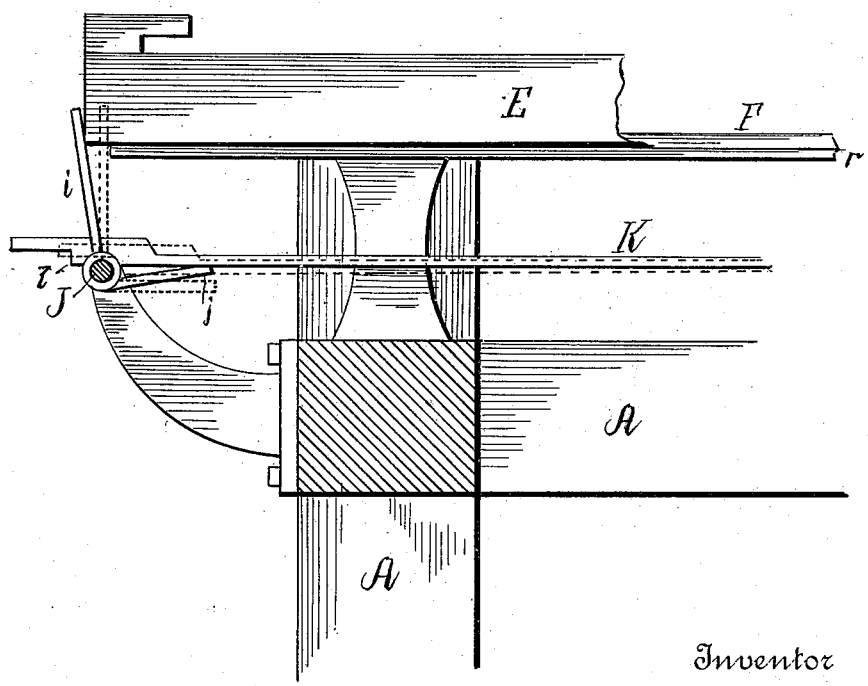

Figure 1 is a plan view of the machine with the sliding carriage removed from the tracks. Fig. 2 is a view of the left-hand side of the machine as shown in Fig. 1. Fig. 3 is a plan view of the sliding carriage detached from the machine, the tracks being indicated by dotted lines. Fig. 4 is a vertical longitudinal section of the machine between the tracks, showing the carriage in position on the same. Figs. 5, 5ª show a detail of the mechanism for throwing the carriage out of operation. Fig. 6 is a side view of the carriage detached, the screw-shaft being shown in section. Fig. 7 is a side view of the nut and strap detached, which connect the head-block and screw-shaft. Fig. 8 is an end view of a portion of the head-block, showing the screw-shaft in section and the nut and strap in position. Fig. 9 is a plan view of the nut and strap detached, showing also the locking-cam. Fig. 10 is a side view of the screw-shaft, nut, strap, and cam connected with the head-block, which is shown partly in cross-section. Fig. 11 is a bottom view of the carriage, head-block, and screw-shaft, the nut and strap not being shown, but their position being indicated. Fig. 12 is an end view of the carriage, showing the tappet for rotating the screw-shaft. Fig. 13 is a side view of one end of the machine, showing the operation of the mechanism for reversing the movement of the carriage. Fig. 14 is a vertical section of the intermediate drive cone-wheel, showing the position of the pulley driven thereby in relation thereto. Fig. 15 is a detail view of the holding-dogs carried by the head-block, and Fig. 16 is a section of the outer track on which the carriage travels.

A is the frame-work of the sawing-machine, and B the main driving-shaft, having pulley a, around which passes the belt which drives the machine.

C is the saw, which is carried on the inner end of the shaft B, and on the outer end of the same shaft is carried a cone-pulley, D, for transmitting power to reciprocate the carriage.

E is the carriage, which reciprocates on tracks F F, and it is provided with a rack, b. This rack is engaged by a pinion, c, upon a cross-shaft, d, on the outer end of which is a friction-pulley, G.

H is an intermediate drive cone-wheel, which rotates the pulley G first in one direction and then in the other. This cone-wheel is driven constantly in one direction from the cone-pulley D by means of an intermediate loose pulley, e, which is held in frictional contact with the outer surface of pulley D and wheel H. The loose pulley e is adjusted between the cone-wheels D and H by being mounted in a movable frame, W. The lower end of this frame is loosely held between horizontal guides w w. A rod, x, pivoted at opposite ends to the main frame A and the frame W, holds the latter in position. The weight of the frame W gives the necessary friction between the pulley e and the wheels D and H. The wheel H is mounted loosely on the crank f of a crank rock-shaft, I, so that it can be raised and lowered. The outer rim, g, of the wheel H projects inwardly beyond the spokes or web of the wheel, as also does the hub h, thus forming two annular frictional surfaces.

The frictional pulley G is located between the hub h and rim g, and its diameter is slightly less than the radial distance between those parts. By means of the crank-shaft I either the rim or hub can be brought into contact with the pulley G to rotate the same. It is evident that when in contact with the rim the pulley G, and with it the pinion c, will be rotated at a much greater speed than when in contact with the hub and in an opposite direction. The rapid rotation is utilized to move the carriage away from the saw, and the slow rotation during the movement of carriage while presenting material to be sawed. To effect these alternate movements, and thus reciprocate the carriage, it is only necessary to rotate or oscillate the crank rock-shaft I. In this machine the alternate oscillation of the rock-shaft is effected automatically by the carriage itself, which rocks the shaft in opposite directions at the limits of its travel to and from the saw.

J is a rock-shaft mounted between the extreme ends of the tracks F F beyond the saw. This shaft has a vertical tappet-pin, $i$, which extends upward so as to be in the path of the carriage. The shaft J is also provided with an L-shaped arm, $j$, extending normally in a horizontal plane. The weight of this arm causes the shaft J to resume its normal position with the tappet-pin $i$ in the path of the carriage. Any suitable stop—such as the tappet-pin—coming in contact with the end of one of the rails F limits the rotation of the shaft J.

The crank rock-shaft I extends between the rails F F, and has a vertically-extending arm, $k$, secured thereto. To this arm $k$ is pivoted one end of a rod, K, the outer end of which rests on the shaft J immediately above the L-shaped arm $j$. The weight of the wheel H causes it to normally assume its lowermost position and to turn the crank $f$ downward, so that normally the rim of the wheel H would be in contact with the wheel G, and thus the carriage would be run backward or away from the saw. In order, therefore, that the hub of wheel H may be in contact with the pulley G, so as to run the carriage forward toward the saw, the wheel H must be held up at its highest position. The wheel H is thus held up by a downwardly-projecting lip, $l$, on the under side of rod K, which is held in contact with the shaft J by the weight of the wheel H. When in this position, the carriage travels slowly forward toward the saw until it comes in contact with the tappet $i$. When the carriage strikes tappet $i$, it oscillates the shaft J, moving the L-shaped arm $j$ upward, which, coming in contact with the rod K, lifts the latter up from the shaft J until the lip $l$ is released from engagement therewith. When the lip $l$ is thus freed from the shaft J, the wheel H, having nothing to hold it up, drops down, disengaging the hub from the pulley G and engaging its rim therewith, thus reversing the movement of the carriage. The wheel H in descending turns the shaft I, and with it the arm $k$, carrying the rod K forward, so that the lip $l$ is moved beyond the shaft J. The carriage then runs quickly backward until it reaches the limit of travel in that direction. The arm $k$ on the crank-shaft I extends upward beyond the pivot-point of the rod K, and the carriage is provided with a downwardly-extending loop or hook, $m$, which is adapted to encounter the arm $k$ just before the carriage reaches its extreme backward limit. This hook catches the free end of the arm $k$ and pulls it backward, thus oscillating the shaft I and lifting the wheel H until its hub is brought in contact with the pulley G, thus again reversing the movement of the carriage. At the same time rod K is drawn backward until its lip $l$ again engages the shaft J, so that the wheel H is held in its raised position. It will thus be seen that the reversal of the movement of the carriage in both directions is automatically accomplished.

It will also be seen that as the carriage runs quickly backward any shock which might be given it when it reaches the limit of its backward movement is counteracted by the weight of the wheel H. In changing the position of the wheel H the arm $k$ must be moved a distance of some extent, and the carriage consequently must move some distance while raising the wheel H, which gives the necessary cushioning-space to relieve it of any shock incident to the change of direction in its movement.

The carriage E is provided with a sliding head-block, L, which slides on the carriage in a general direction at right angles to the travel of the carriage. This head-block is provided with the usual means for holding the material to be sawed into shingles. The means usually employed for this purpose consist of holding-dogs which slide in a groove on the upper surface of the head-block and are operated by a right-and-left screw. Such dogs are illustrated in Fig. 14, they being designed to slide in the groove on the head-block shown in Fig. 3. This head-block is moved intermittently forward toward the saws in order to cut off a shingle at each complete oscillation of the carriage, and at the same time the angle at which it stands is varied, so as to give the proper taper to the shingles. The forward and angular movements of the head-block are automatically effected by a cross eccentric screw-shaft, M, eccentrically journaled in the sides of the carriage. The pitch of the threads on this shaft determines the thickness of the shingles, and the eccentricity determines the amount of taper to be given to the shingles. Bolted to the under side of the head-block is a half-nut, N, female screw-threaded to engage the eccentric screw-shaft. (See Figs. 6 to 11.) Also bolted to the head-block and to the half-nut is a strap, O, which loosely embraces the screw-shaft. The half-nut is held in engagement with the screw-shaft by an eccentric rotatable cam, P, having a circular aperture through which the screw-shaft just passes. This cam is held between the under surface of the head-block and a projecting lip on the strap O. The cam is provided with an operatinghandle, o, and its movement is limited by the handle coming in contact with projecting lugs p p on the strap. By rotating this cam the half-nut can be either held in or out of engagement with the screw-shaft. The cam is only moved to disengage the half-nut when the carriage and screw-shaft are stationary, and hence during the movement of the cam the screw-shaft is fixed and immovable. The cam in its movement rotates upon the screw-shaft, and when the thick portion of the cam encounters the under surface of the head-block it moves the head-block upward away from the shaft, and as the half-nut is rigidly secured to the head-block this same movement lifts the half-nut out of engagement with the shaft. When thus out of engagement the head-block can be moved back and forth with ease. To again bring the half-nut into engagement with the screw-shaft, the cam is again turned on the screw-shaft in the opposite direction, so as to bring its thick portion into contact with the lip n on the strap O, thus depressing the strap. Since the strap is rigidly secured to the head-block and half-nut, this movement depresses the head-block and half-nut, bringing the latter again into engagement with the screw-shaft. If the head-block slides in ways on the carriage, as is usual in such cases, there will be sufficient play or room left to permit this up-and-down movement of the head-block. It is not essential, however, that the head-block should slide in ways. Its ends may simply rest on the carriage, since, being firmly held to the screw-shaft and the screw-shaft having no play in its bearings, it will be held in position with certainty. The screw-shaft is automatically and intermittently rotated a half-revolution at each complete oscillation of the carriage, and at the time when the carriage reverses to move forward, by the following mechanism:

The outer end of the screw-shaft is extended beyond its bearing and carries a double tappet, Q, which has two arms, q q, having curved faces. (See Fig. 12.) During the oscillating of the carriage this tappet is held in a horizontal position, sliding on a horizontal flange, r, of the outer rail, F. The outer rail is provided at its rear end with a projecting stop, R, having an inclined face, which is adapted to be engaged by the tappet Q. The flange r does not extend to the stop R, but there is an open space between them long enough to permit the rotation of the tappet Q.

The operation is as follows: Just as the carriage reaches its limit of travel backward one arm q of the tappet strikes the inclined stop R, and the tappet is slightly turned thereby just far enough to depress the end of the other tappet-arm q just below the plane of the flange r. As the carriage moves forward, the flange r is encountered by the arm q and the tappet is turned half-way round, thus rotating the eccentric screw-shaft half-way. The rotation of the screw-shaft thus advances the head-block toward the saw the desired thickness of a shingle. At the same time the angle of the head-block on the carriage is slightly varied by the eccentricity of the shaft. The shaft being eccentric when it is turned, the threads on one side advance slightly faster than those on the other, and this advance of one side being communicated to the head-block changes its angle on the carriage. The shaft being rotated a half-revolution each time, this advance due to the eccentricity of the shaft is communicated alternately to opposite ends of the head-block. In the rotation of the screw-shaft the head-block will be moved slightly up and down and also bodily from side to side. The side to-side movement is of no consequence, since it is in any case very slight, and the carriage is at all times carried sufficiently beyond the cutting-edge of the saw to cut the shingle entirely from the block of wood held by the head-block. The up-and-down movement is easily counteracted, so as to have no effect upon the sawing. The movement of the shaft only takes place when the carriage has reached its limit of movement away from the saw. During the sawing the shaft is stationary. There are therefore only two different positions of the shaft possible during the progress of the sawing, these two positions being those effected by its successive half-rotations; but in either case the shaft is so mounted and the tappet Q so arranged that during the reciprocation of the carriage the plane passing through the true axis of the shaft and its axis of rotation is parallel with the plane of the movement of the carriage. Hence, this being the case, the head-block will always have the same vertical position while the sawing is in progress. When all the material held by the head-block has been cut, the cam P is turned so as to disconnect the half-nut, and the head-block is then moved back and again supplied with material.

In order to render the machine completely automatic, it is so arranged that when the head-block has advanced as far as it safely can toward the saw the rack b is automatically disconnected from the pinion c, so that the movement of the carriage will be entirely stopped. The rack b has longitudinal side grooves, s s, which are engaged by lips t t, carried by a bar, S, which slides vertically in suitable ways on the main frame. (See Fig. 5.) This bar S is raised and lowered by means of a crank, u, on a short crank-shaft, T. To this shaft is secured a weighted lever, U, the free end of which is held elevated on a notched arm, v, carried by the main frame. The head-block L has a downwardly-extending tappet-arm, V, which, coming in contact at the proper time with the weighted lever U, disengages it from the notched arm v. The weighted lever, being thus disengaged, drops down, thus turning the shaft T, raising the bar S, lifting the rack b from the pinion c, and stopping further movement of the carriage. When the head-block has been moved back and refilled, the weighted lever is replaced on the notched arm.

Although the invention has been described in connection with sawing shingles, it is evident that many of the features might be employed in other machines for other purposes. For example, the construction and arrangement of the pulleys H and G could be used wherever it is desirable to give a carriage a slow forward movement and a rapid movement backward, and the mounting of the idler e can be used in all cases where cone friction pulleys are used.

I claim as my invention—

1. In a shingle-sawing machine, the traveling carriage and a sliding head-block mounted thereon, in combination with an eccentric screw-shaft mounted on said carriage and engaging with said head-block, substantially as set forth.

2. In a shingle-sawing machine, the traveling carriage and a sliding head-block mounted thereon, in combination with a half-nut carried by said head-block and an eccentric screw-shaft mounted on said carriage and engaging said half-nut, substantially as set forth.

3. In a shingle-sawing machine, the traveling carriage, a sliding head-block mounted thereon, a half-nut carried by said head-block, and an eccentric screw-shaft mounted on said carriage and engaging said half-nut, in combination with a strap attached to said head-block and loosely embracing said shaft, and an eccentric cam embracing said shaft and held between said strap and head-block, substantially as and for the purpose set forth.

4. The traveling carriage, the track on which it runs, a sliding head-block mounted on said carriage, and an eccentric screw-shaft mounted in said carriage and engaging said head-block, in combination with a flange on one side of the track, a stop on said track placed beyond the termination of said flange, and a tappet secured to said eccentric screw-shaft, which is rotated a half-revolution by contact with said stop and the end of said flange, substantially as set forth.

5. The traveling carriage E, having rack b and loop or hook m, cross-shaft d, having pinion c, engaging said rack, and pulley G on said cross-shaft, in combination with crank rock-shaft I, driven pulley H, mounted on the crank of said shaft and having friction-hub h and rim g, between which said pulley G is mounted, the weight of pulley H normally holding said rim g in contact with said pulley G, and an upwardly-extending arm, k, on said rock-shaft in the path of said loop or hook m on said carriage, which is engaged by said loop on the backward movement of the carriage, substantially as set forth.

6. The tracks F F, the carriage E, traveling thereon, having rack b, cross-shaft d, having pinion c, engaging said rack, pulley G on said cross-shaft, and rock-shaft J, mounted between said tracks and having tappet i in the path of said carriage and horizontal arm j, in combination with crank rock-shaft I, driven pulley H, mounted on the crank thereof and having friction-hub h and rim g, adapted to said pulley G, arm k on said rock-shaft, and rod K, pivoted at one end to said arm k, and having its other end resting on said shaft J above the arm j, said rod having a lip, l, engaging said shaft J, substantially as and for the purpose herein specified.

7. Cone-pulleys D and H, in combination with horizontal guides w w on a fixed framework, a movable frame, W, having one end held freely between said guides, a rod, x, pivoted at opposite ends to said movable frame and a fixed framework, and a friction-pulley, e, adapted to said cone-pulleys, mounted in said movable frame W, substantially as set forth.

8. The traveling carriage E, having rack b, a rotating pinion, c, engaging said rack, a crank rock-shaft, T, and a sliding bar, S, connecting the crank on said shaft and said rack b, whereby by the rotation of said crank rock-shaft said rack may be engaged to and disengaged from said pinion, in combination with a weighted lever, U, connected to said rock-shaft and held elevated by a notch on a fixed part, and a sliding head-block, L, on said carriage E, having a tappet-arm, V, which releases said lever U, substantially as set forth.

In testimony whereof I affix my signature in presence of two witnesses.

SAMUEL S. MORTON.

Witnesses:
JNO. A. METZELL,
V. K. KEESEY.